United States Patent [19]

Betensky et al.

[11] Patent Number: 4,936,661
[45] Date of Patent: Jun. 26, 1990

[54] ZOOM LENS WITH SHORT BACK FOCAL LENGTH

[75] Inventors: Ellis I. Betensky, Redding, Conn.; Melvyn H. Kreitzer; Jacob Moskovich, both of Cincinnati, Ohio

[73] Assignee: Opcon Associates, Inc., Redding, Conn.

[21] Appl. No.: 288,429

[22] Filed: Dec. 22, 1988

Related U.S. Application Data

[63] Continuation-in-part of Ser. No. 76,893, Jul. 23, 1987.

[51] Int. Cl.$^5$ ............................................. G02B 15/15
[52] U.S. Cl. .................................... 350/423; 350/427; 350/432
[58] Field of Search ........................ 350/423, 427, 432

[56] References Cited

U.S. PATENT DOCUMENTS

| | | |
|---|---|---|
| 4,304,466 | 12/1981 | Betensky . |
| 4,636,040 | 1/1987 | Tokumaru . |
| 4,659,186 | 4/1987 | Sato et al. . |
| 4,679,913 | 7/1987 | Sato et al. . |
| 4,682,860 | 7/1987 | Tanaka et al. . |
| 4,720,179 | 1/1988 | Ito . |
| 4,721,371 | 1/1988 | Imai . |

FOREIGN PATENT DOCUMENTS 62-235916  10/1987  Japan .

*Primary Examiner*—Rodney B. Bovernick
*Assistant Examiner*—Rebecca D. Gass
*Attorney, Agent, or Firm*—Robert H. Montgomery

[57] ABSTRACT

A two lens unit zoom lens of plus, minus configuration where the rear negative group provides the primary variator function and the positive first lens unit consists of a negative sub-unit and a positive sub-unit and where the sub-units may move differentially during zooming.

40 Claims, 5 Drawing Sheets

ZOOM LENS WITH SHORT BACK FOCAL LENGTH

RELATED APPLICATION

This application is a continuation-in-part of application Ser. No. 076,893, filed July 23, 1987, now abandoned.

FIELD OF THE INVENTION

This invention relates to zoom lenses and, more particularly, relates to zoom lenses having a short back focal length.

BACKGROUND OF THE INVENTION

The lenses of the type used in cameras of the 35 millimeter film size in single lens reflex cameras have had to have long back focal lengths in order to provide room for a movable viewing mirror. Zoom lenses for cinematography and video applications have not been restricted to a long back focal length and usually have relative apertures in excess of f/2.8 which must be held during zooming. For these reasons, it has not been customary to utilize the lens unit nearest the image plane for the primary magnification change, that is, the variator function.

Recently, zoom lenses have been introduced for 35 millimeter cameras of the type which do not utilize a mirror for through-the-lens viewing. An example is shown in Japanese patent application laid open No. 57-201213. In this disclosure, a first positive lens unit is followed by a rear negative lens unit, both lens units moving to change the equivalent focal length (EFL) of the lens. The first lens unit is of a modified triplet type construction having a strong central negative element, while the rear lens unit consists of a positive meniscus element followed by a negative meniscus element. This design is claimed to have a focal range of less than two to one. However, it would not be difficult to extend the range to about two to one by compounding the elements and through the efficient use of aspheric surfaces. These lenses, at the present time, may be found in viewfinder type 35 millimeter cameras.

Lenses of this type are also disclosed in U.S. Pat. Nos. 4,659,186; 4,679,913; 4,682,860; 4,720,179; and 4,721,371, all of which utilize a triplet or modified triplet front group.

The type of design discussed above is capable of a very short front vertex to image length at the storage position. Typically, it is about one and one-half times the minimum EFL, depending upon the EFL range. As a result, this lens type is successful for compact cameras but a two to one EFL range limits its usefulness.

Extending the EFL beyond a range of two to one has not been accomplished because of a fundamental limitation of the modified triplet construction. The basic triplet form of lens is well known to have adequate degrees of design freedom to correct all the primary aberrations. This has been the reason for the popularity and success of this design type for many years. But these features of the triplet type lens do not make triplet type lenses ideal for applications in zoom lenses where it is not desirable to correct all the primary aberrations in any particular lens unit.

In the triplet design, the central negative element normally will have considerable amounts of overcorrected spherical aberration. To correct this is very difficult, requiring considerable complexity, due to the somewhat conflicting distortion and astigmatism introduced at the short EFL (wide angle) position. Similarly, the triplet lens form is suitable for correction of Petzval curvature. The negative element of the triplet more than compensates for that of the positive elements if normal glasses are used. It is thus apparent that neither lens unit is individually corrected, and the triplet is used in an abnormal manner.

A second disadvantage of the triplet type of first lens unit is that the triplet usually has a principal point near the center of the lens or, in some applications, near the object side. For a compact zoom lens with a first positive lens unit and a second negative lens unit, this means the amount of zooming space is reduced by the distance from the last lens vertex to the second principal point. This results in the use of greater optical powers, and thus, more severe requirements for aberration correction for a given aperture and field angle.

Accordingly, the present invention provides a new and improved zoom lens of the type described of simplified construction and extended zoom range.

SUMMARY OF THE INVENTION

Lenses embodying the present invention have two lens units. The first lens unit from the object side comprises two sub-units, a first negative sub-unit followed by a positive sub-unit. The first sub-unit is constructed to increase the aperture height of marginal axial rays emanating from a distant object. This is particularly helpful in contributing to correction of distortion introduced by the second lens unit. The first sub-unit of the first lens unit also has an important function of moving the principal points to the rear of the first lens unit. The second lens sub-unit need only be one or more positive elements in the simplest form, but can be compounded with negative elements for color correction.

To extend the zoom range, it is advantageous to separate the two sub-units in a continuously variable manner during zooming. This differential movement, in addition to providing an additional change of magnification, provides a change of off axis aberrations as a function of focal length. This is important because the aberrations of the lens units are not individually corrected. A further alternate procedure to further extend the zoom range within any particular configurations of elements is to divide the second lens unit, the primary zooming unit, into two sub-units and to move the separate sub-units differentially during zooming. The same can be also accomplished by subdividing and moving components independently within the first and second sub-units of the first unit.

Because the lens units are not independently corrected for aberrations, the least complex type of units and parts of units are achieved through the use of aspheric surfaces.

A further advantage of the invention is that either the entire first lens unit or the first sub-unit (negative) can be moved separately for focusing because the optical powers are relatively large. The large power permits short travel and minimal aberration change.

An object of this invention is to provide a new and improved zoom lens having a short back focal length.

Another object of the invention is to provide a lens of the type described which is of simplified construction and may provide an increased zoom range.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

DETAILED DESCRIPTION OF PREFERRED EMBODIMENTS OF THE INVENTION

Figure 1:
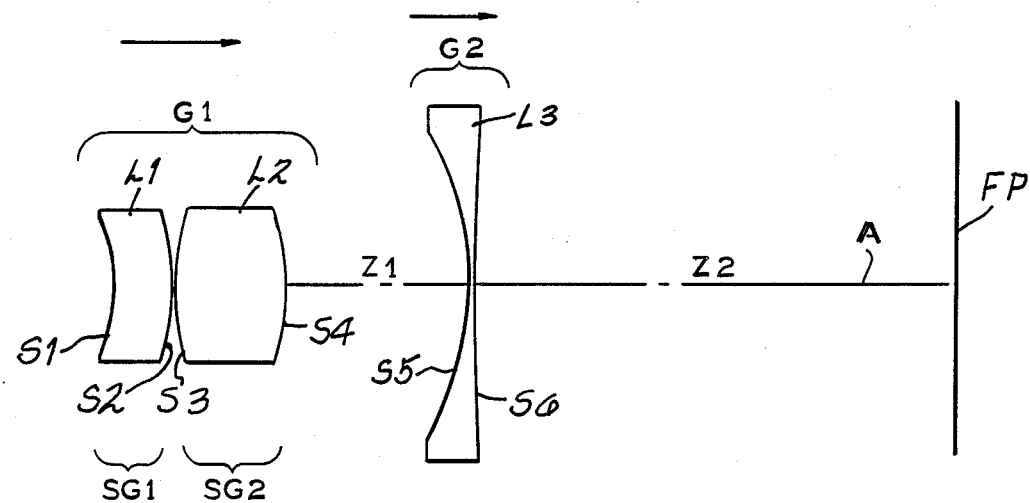
FIGS. 1-10 are schematic side elevations of lenses embodying the invention.

Lenses, as shown in FIGS. 1-10 are substantially described in the following tables I-X. The lenses are identified by lens units G followed by an arabic numeral, sub-units are identified by SG followed by an arabic numeral in the drawings. In the drawings and in the following tables, the lens elements are identified by the reference L followed by an arabic numeral increasing from the object to the image end. The surfaces of the elements are identified by the reference S with an arabic numeral progressing from the object end to the image end. The zoom spacings are given in the following tables, together with the axial distance between surfaces of all elements; and in the drawings the variable zoom spacings are identified by Z followed by an arabic numeral. In the drawings, FP represents the focal plane of the lens, and A indicates the optical axis.

The majority of the examples set forth herein include one or more aspheric surfaces, which is defined by the equation $$X = \frac{Cy^2}{1 + \sqrt{1 - (1+k)c^2y^2}} + Dy^4 + Ey^6 + Fy^8 + Gy^{10} + Hy^{12} + Iy^{14}$$

where X is the surface sag at a semi-aperture distance Y from the axis A of the lens; C is the curvature of a lens surface at the optical axis A equal to the reciprocal of the radius in millimeters; K is a conic constant; and D, E, F, G, H and I are coefficients. The coefficients of the aspheric surfaces are set out in the tables identifying each lens.

FIG. 1 exemplifies a lens embodying the invention which consists of two lens units G1 and G2. The first lens unit G1 consists of two sub-units SG1 and SG2 and is overall positive. Each sub-unit consists of one element L1 and L2, respectively, in the embodiment of FIG. 1. The first sub-unit SG1 is negative, and has a concave object side surface. The second sub-unit SG2 is strongly positive. Lens unit G2 consists of a single biconcave element. As will hereinafter be specified, surfaces S4 and S5 are aspheric. The design of the first lens unit is such that the second principal point thereof is outside of the image side vertex or essentially at the vertex. The vertex is the point of intersection of the image side surface (S4 in FIGS. 1 and 2) with the optical axis A.

The principal points of a lens or a lens unit are defined by the intersection of the principal planes with the optical axis.

A lens unit acts as if it refracts all paraxial rays from a distant object at a principal plane. The principal plane is the locus of all points at which the paraxial rays are refracted in passing through the lens unit. Each lens unit has two principal planes and hence two principal points. The location of the principal points will depend on the configuration of the lens unit. The principal points thus define the effective refractive properties of the lens unit and the physical location of the optical system. Otherwise stated, the principal points of an optical system are points in the paraxial region which are one-to-one erect images of one another.

In the present invention, the configuration of the first lens unit G1 is such that the second principal point is beyond the rear vertex or closely adjacent thereto within the lens unit. The positioning of the second principal point permits the amount of zooming space between the first and second len units $Z_1$ in FIGS. 1-4 and 7, and $Z_2$ in FIGS. 5, 6 and 8, to be reduced by approximately half the thickness of the first lens unit. This, in turn, allows achievement of a wider zooming range within short travel distances of the lens units, and also shortens travel of the first lens unit or a sub-unit thereof for focusing.

The position of the second principal point PP2 of the first lens unit G1 of each embodiment when in the short EFL position is hereinafter specified in Table XI, together with the powers of the lens units as related to the geometric mean of the power of each lens at extremes of the EFL of each lens.

Figure 4:
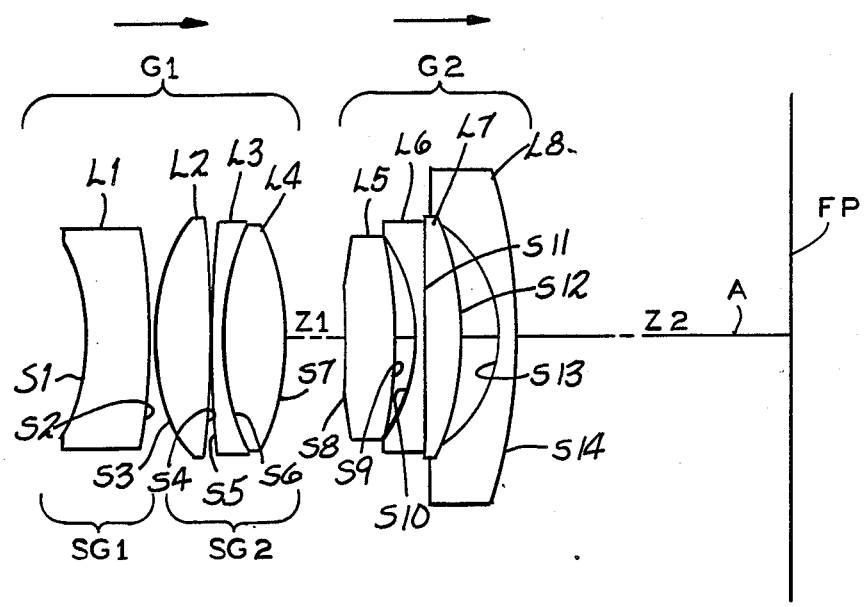
Figure 10:
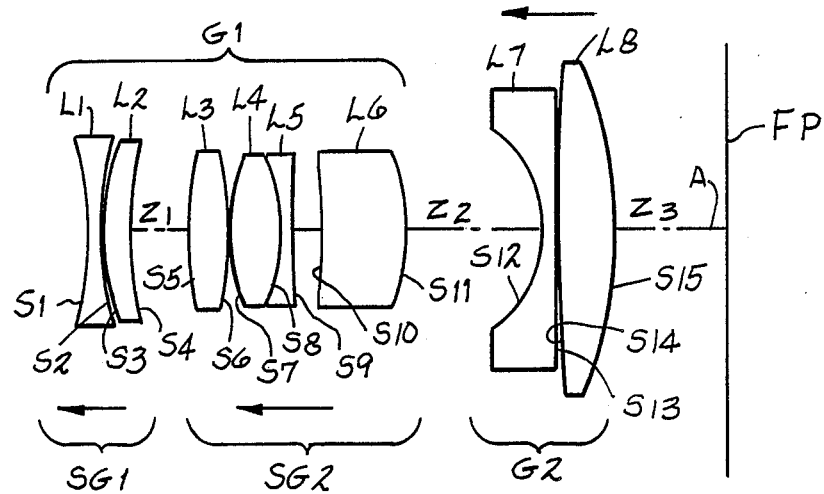

The distance of the second principal PP2 where positive is to the right of the rear vertex of the first lens group G1 in the wide angle position and to the left of the rear vertex when negative as in the example of Table IV, FIG. 4 and Table X, FIG. 10. In the example of FIG. 4 and Table IV, the second principal point PP2 is less than 0.01% of the focal length of the first lens unit G1 from the object side vertex thereof. In the example of Table X and FIG. 10, the second principal point of the first lens unit is less than 8% of the shorter EFL of the lens within the thick positive meniscus L6.

Another feature of the invention, as will hereinafter be explained is that the magnification ratio of the second lens unit is greater than the magnification ratio of the second sub-unit of the first lens unit.

In the example of FIG. 1 and Table I, the second principal point is on the image side of the vertex of surface S4. Focusing may be accomplished by axial movement of sub unit SG1 or the entire lens unit G1 in all embodiments.

The fundamental concept of the lens of FIG. 1 and Table I can be further developed to increase relative aperture, field and zoom ranges as hereinafter described in further embodiments of the invention.

Figure 2:
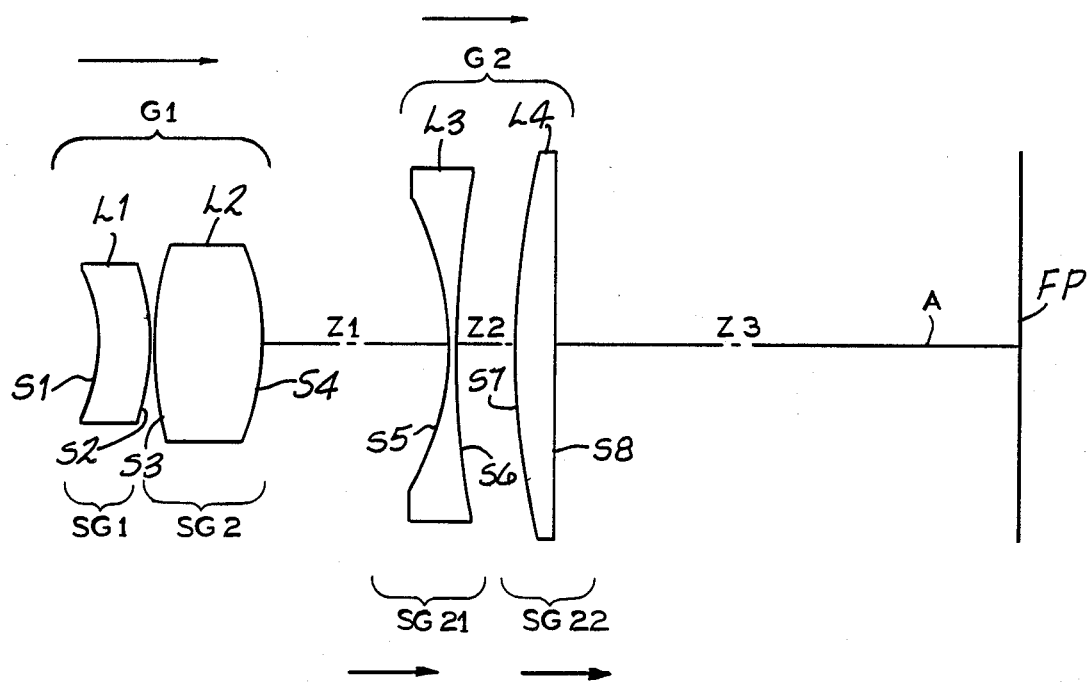

The embodiment of FIG. 2 and Table II also comprises two lens units in which the first lens unit G1 is overall positive, and consists of two elements L1 and L2 of negative, positive configuration, respectively. Lens unit G2 also consists of two lens sub-units SG21 and SG22. Sub-unit SG21 consists of a biconcave element L3 and sub-unit SG22 is a positive meniscus element L4. Here there is differential movement Z2 between sub-units SG21 and SG22, as is defined in Table II. The second principal point PP2 of lens unit G1 is located on the image side of the vertex of surface S4. Surface S4 is aspheric.

Figure 3:
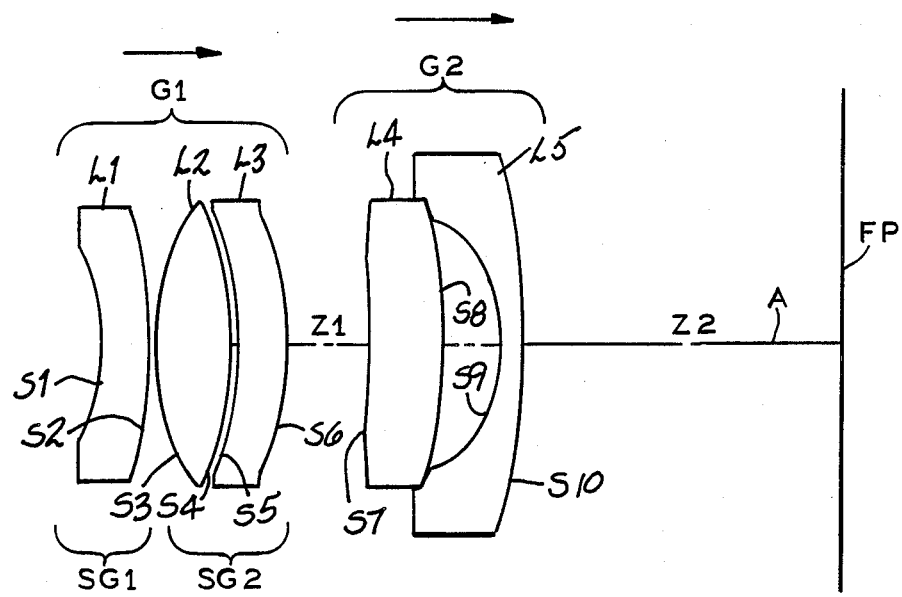

FIG. 3 exemplifies a lens embodying the invention where sub-unit SG1 of lens unit G1 is a negative meniscus concave to the image, and sub-unit SG2 comprises an overall positive component comprising lens elements L2 and L3, which consists of a biconvex element L2 and a positive meniscus L3. Again, the unit G1 is overall positive. Lens unit G2 comprises two elements L4 and L5, where L4 is a positive meniscus slightly concave to the object, and L5 is a negative meniscus strongly concave to the object side. In this example, surfaces S4, S6 and S8 are aspheric, as specified Table III. Again, the second principal point of the first lens unit is on the image side of the vertex of surface S6.

FIG. 4 exemplifies another embodiment of the invention where the first sub-unit SG1 of lens unit G1 comprises a thick negative meniscus concave to the object. Sub-unit SG2 of lens unit G1 comprises a biconvex element L2 and a biconvex doublet L3 and L4. The second lens unit consists from the image end of a biconvex element L5, a doublet in the form of an overall negative meniscus concave to the object L6 and L7, and a negative meniscus element concave to the object L8. Here, the second principal point of the first lens unit G1 is slightly inside the vertex of surface S7 by a very small distance as set forth in Table IX. In the embodiment of FIG. 4, surfaces S4, S7 and S8 are aspheric, as pointed out in Table IV.

Figure 5:
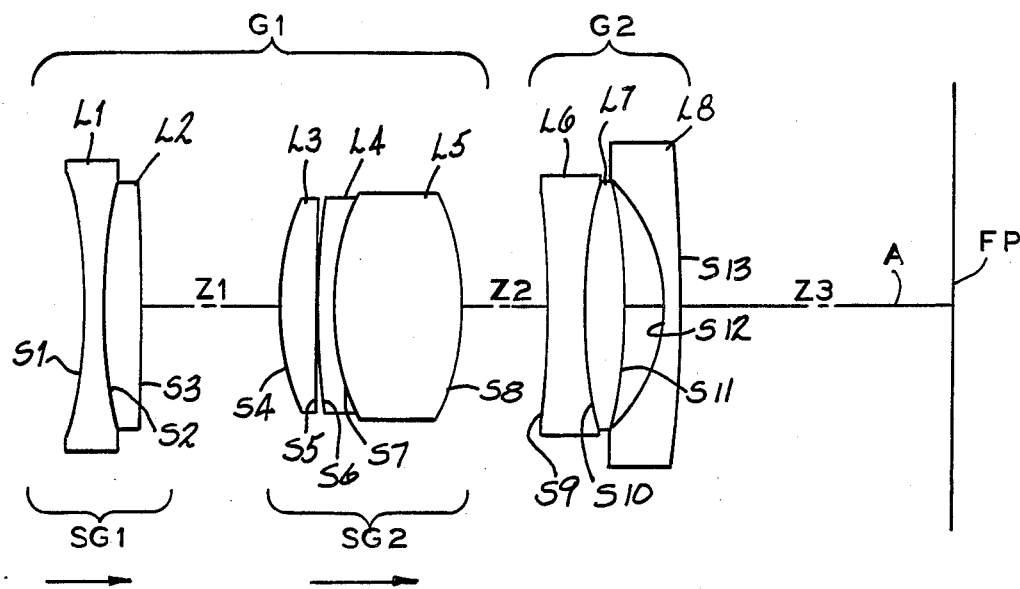

In the embodiment of FIG. 5 and Table V, the sub-units SG1 and SG2 of lens unit G1 have differential movement, as represented by the distance Z1. The first sub-unit SG1 comprises a biconcave element L1 and a biconvex element L2 in the form of a cemented doublet of overall negative power. The second sub-unit SG2 of lens unit G1 comprises an element L3 of biconvex form and a biconvex doublet consisting of elements L4 and L5. Lens unit G2 comprises a doublet L6 and L7 consisting of a biconcave and a biconvex member, respectively, and a negative meniscus element L8 concave to the object side.

Figure 6:
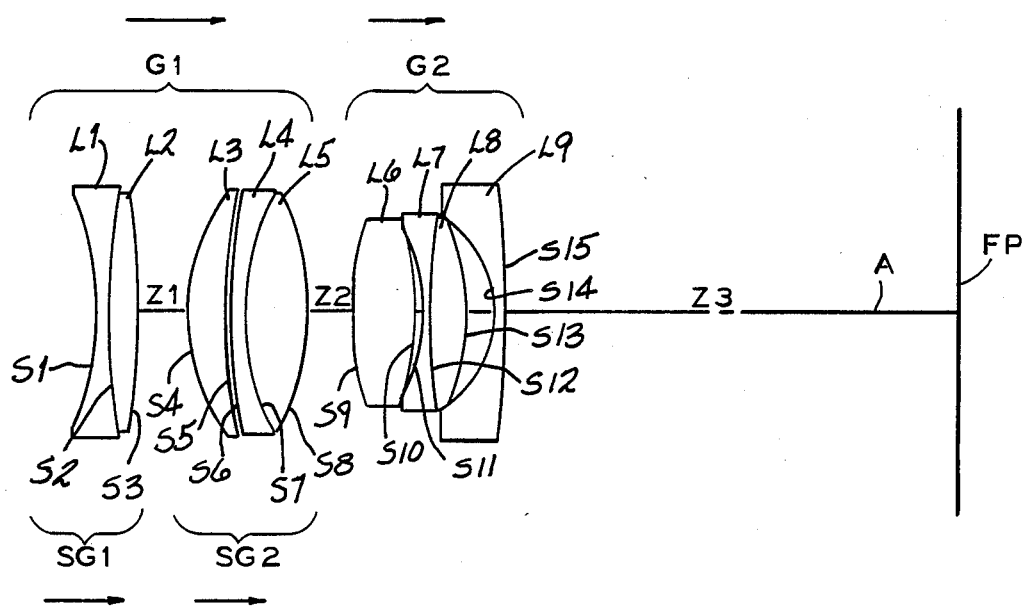

FIG. 6 and Table VI disclose still another embodiment of the invention. In the first lens unit, sub-unit SG1 comprises a biconcave element L1 and a biconvex element L2 in the form of a negative meniscus concave to the object. Sub-unit SG2 of lens unit G1 is strongly positive and comprises a positive element L3 of meniscus form convex to the object, and a doublet consisting of element L4 and L5 in an overall convex configuration.

Lens unit G2 comprises a leading biconvex element L6 from the object side, a doublet comprising a biconcave element and a biconvex element L7 and L8, respectively, and a negative meniscus concave to the object L9. The overall power of lens unit G2 is negative.

In this embodiment, the sub-units SG1 and SG2 of lens unit G1 move differentially, as shown by the data for the zoom spacing Z1 in Table VI. Surfaces S5 and S9 are aspheric.

Figure 7:
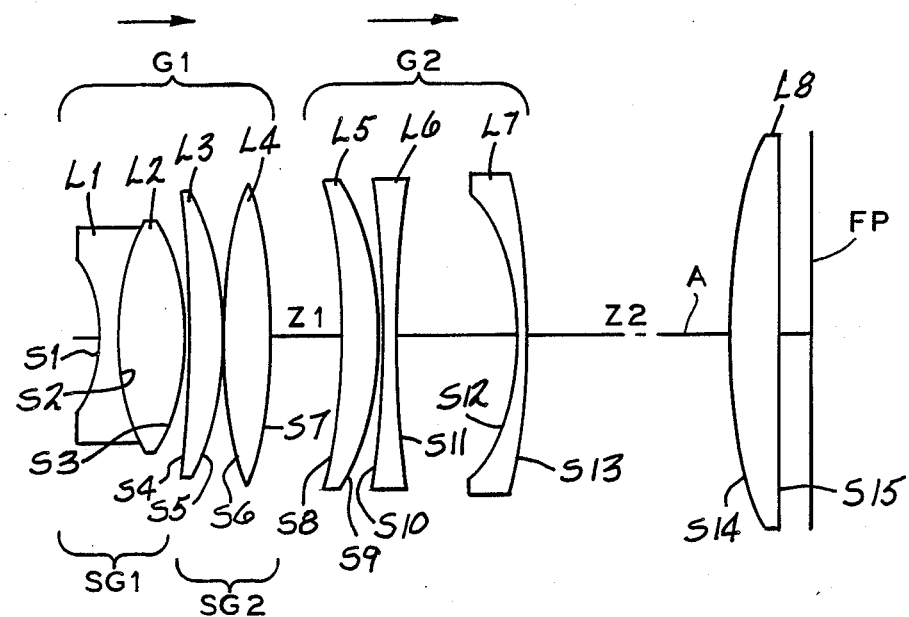

FIG. 7 and Table VII exemplify another embodiment of the invention. Here again, the first lens unit G1 comprises a sub-unit SG1 and a sub-unit SG2. Sub-unit SG1 consists of a doublet in the form of a biconcave element L1 and a biconvex element L2, and is overall negative and has an object side surface S1 which is concave to the object. The second sub-unit SG2 of lens unit G1 comprises two positive elements L3 and L4. Lens unit G2 comprises a positive meniscus element L5, a biconcave element L6 and a negative meniscus element L7 which is concave to the object side.

This lens form also provides a positive stationary element L8 which serves as a field flattener. This embodiment has only a small zoom ratio of approximately two to one. In this embodiment, the two sub-units SG1 and SG2 of lens unit G1 move as a pair and there is no differential movement of the elements of lens unit G2.

Figure 8:
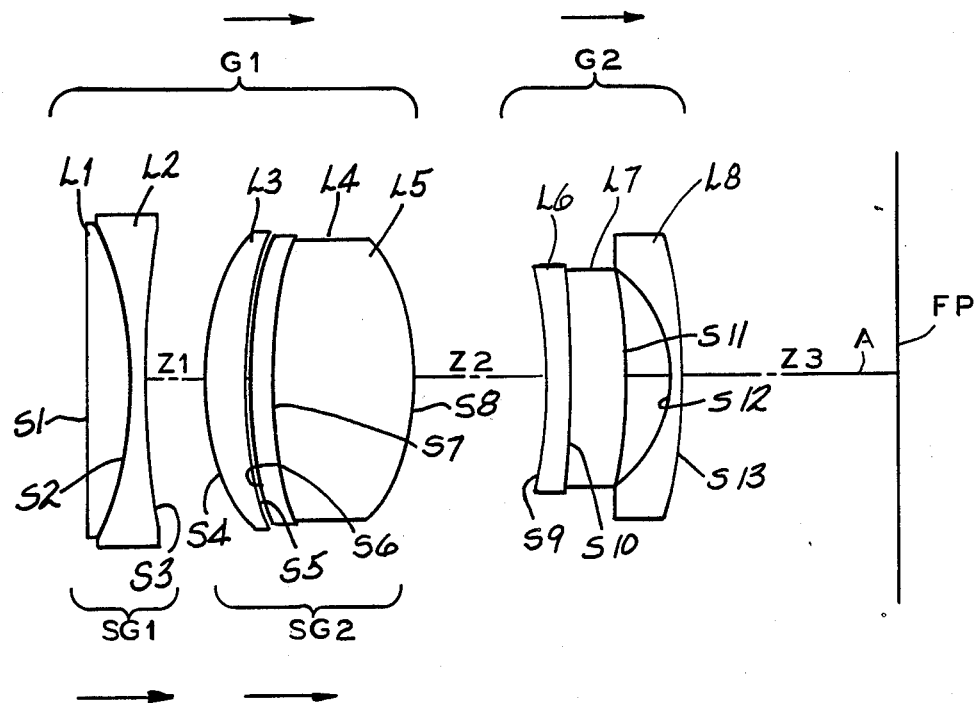

Reference is now made to the lens of FIG. 8 and Table VIII. The first lens unit G1 comprises a negative sub-unit SG1 which consists of a positive element L1 concave to the object and biconcave element L2 of overall negative power. The second sub-unit of G1 is of overall positive power and consists of a positive meniscus element L3 and a doublet consisting of a negative meniscus L4 and a biconvex element L5. These two units move differentially during zooming, as will be shown by the zoom spacing data in Z1 in Table VIII.

The second lens unit G2 comprises a doublet L6 and L7, where L6 is a meniscus concave to the object and L7 is a positive meniscus. L8 is a negative meniscus strongly concave towards the object.

This lens is designed with the aperture stop on the object side of the lens. This provides advantages hereinafter discussed.

Figure 9:
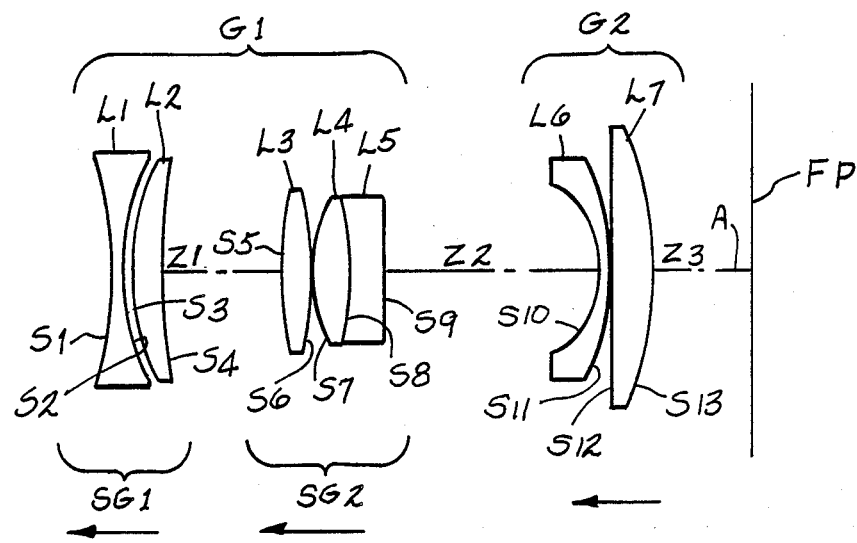

FIG. 9 illustrates another embodiment of the invention in the short focal length position where the first sub-unit SG1 of lens unit G1 comprises a biconcave element L1 and a positive meniscus L2 and sub-unit SG1 is of overall biconcave form. Lens sub-unit SG2 comprises a biconcave element form. Lens sub-unit SG2 comprises a biconcave element L3 and a doublet comprising elements L4 and L5. Lens unit G2 comprises a negative meniscus L6 strongly concave to the object and a positive meniscus L7. The lens of FIG. 9 is fully described in prescription form in Table IX.

FIG. 10 illustrates another lens embodying the invention comprising a first lens sub-unit SG1 of lens unit G1 having elements L1 and L2 which are overall biconcave. Sub-unit SG2 of lens unit G1 comprises a biconvex element L3, a positive doublet comprising elements L4 and L5 and a thick positive meniscus L6. Lens unit G2 comprises a negative element L7 strongly concave to the object and a biconvex element L8. The lens of FIG. 10 is shown in its wide angle position with respect to the focal phane FP. The lens of FIG. 10 is fully described in Table X.

In all of the examples set forth, the first sub-unit of the first lens unit is constructed to monotonically increase the aperture height of marginal axial rays emanating from a distant object and passing therethrough. This contributes to correction of distortion introduced by the second lens unit.

Another characteristic of the invention is that the second sub-unit SG2 of the first lens unit includes at least one biconvex element to provide necessary positive optical power. In some cases, this biconvex element is part of a color correcting doublet.

In the following Tables I-X, the previously described lenses are substantially described in prescription form. In the tables, the surface radii struck from the right on the optical axis are positive and the surface radii struck from the left on the optical axis are negative. The index of refraction $N_e$ of the lens elements is given by the E-line of the spectrum $N_e$ and the dispersion as measured by its Abbe number is under the heading $V_e$.

The tables also set forth the aspheric coefficients of the indicated surfaces and the zoom spacing data for each lens.

In the following examples, all lenses are scaled for an image frame diagonal of 43.2 mm (24×36 mm image frame) except the example of Table VII which is scaled for an image frame diagonal of eleven millimeters.

TABLE I

| LENS | | SURFACE RADIUS(mm) | AXIAL DISTANCE BETWEEN SURFACES(mm) | Ne | Ve |
|---|---|---|---|---|---|
| L1 | S1 | −14.3416 | | | |
| | | | 5.157 | 1.85504 | 23.64 |
| | S2 | −24.109 | | | |
| | | | .10 | | |
| | S3 | 26.025 | | | |
| L2 | | | 9.740 | 1.48914 | 70.24 |
| | S4 | −18.543 | | | |
| | | | Z1 | | |
| | S5 | −27.285 | | | |
| L3 | | | .70 | 1.77621 | 49.40 |
| | S6 | 245.74 | | | |
| | | | Z2 | | |

ASPHERICAL SURFACE DATA:

| S | D | E | F | G | H | I |
|---|---|---|---|---|---|---|
| S4 | .42262E-4 | .30449E-6 | −.22329E-7 | .10317E-8 | −.22266E-10 | .17962E-12 |
| S5 | .59631E-7 | −.38893E-7 | −.44722E-9 | .4091E-11 | .19795E-13 | −.16238E-15 |

ZOOM SPACING DATA:

| EFL(mm) | Z1(mm) | Z2(mm) | | |
|---|---|---|---|---|
| 35.7 | 28.32 | 6.0 | f/No. = 3.5–6.8 | |
| 50.0 | 20.84 | 21.2 | | |
| 68.5 | 15.79 | 41.6 | | |

TABLE II

| LENS | | SURFACE RADIUS(mm) | AXIAL DISTANCE BETWEEN SURFACES(mm) | Ne | Ve |
|---|---|---|---|---|---|
| L1 | S1 | −13.348 | | | |
| | | | 4.071 | 1.8550 | 23.64 |
| | S2 | −22.981 | | | |
| | | | .20 | | |
| | S3 | 30.370 | | | |
| L2 | | | 9.00 | 1.5660 | 63.7 |
| | S4 | −17.885 | | | |
| | | | Z1 | | |
| | S5 | −24.490 | | | |
| L3 | | | .70 | 1.841 | 38.6 |
| | S6 | 80.551 | | | |
| | | | Z2 | | |
| | S7 | 66.614 | | | |
| L4 | | | 3.00 | 1.759 | 28.4 |
| | S8 | 1139.812 | | | |
| | | | Z3 | | |

ASPHERICAL SURFACE DATA:

| S | D | E | F | G | H | I |
|---|---|---|---|---|---|---|
| S4 | .492885E-4 | −.11174E-6 | −.20296E-7 | .12881E-8 | −.26697E-10 | .18975E-12 |

ZOOM SPACING DATA:

| EFL(mm) | Z1(mm) | Z2(mm) | Z3(mm) | |
|---|---|---|---|---|
| 35.69 | 25.36 | .1 | 5.99 | F/No. = 3.5–6.8 |
| 49.97 | 19.22 | 3.00 | 18.13 | |
| 68.44 | 14.76 | 4.69 | 37.95 | |

TABLE III

| LENS | | SURFACE RADIUS(mm) | AXIAL DISTANCE BETWEEN SURFACES(mm) | Ne | Ve |
|---|---|---|---|---|---|
| L1 | S1 | −15.629 | | | |
| | | | 3.29 | 1.8118 | 33.0 |
| | S2 | −40.598 | | | |
| | | | .16 | | |
| | S3 | 16.045 | | | |
| L2 | | | 5.83 | 1.4891 | 70.2 |
| | S4 | −20.437 | | | |
| | | | .50 | | |
| | S5 | −27.281 | | | |
| L3 | | | 3.73 | 1.6425 | 59.9 |
| | S6 | −17.169 | | | |
| | | | Z1 | | |
| | S7 | −77.093 | | | |
| L4 | | | 5.47 | 1.5705 | 42.6 |
| | S8 | −44.998 | | | |
| | | | 4.45 | | |
| | S9 | −10.834 | | | |

TABLE III-continued

| LENS | | SURFACE RADIUS(mm) | AXIAL DISTANCE BETWEEN SURFACES(mm) | Ne | Ve |
|---|---|---|---|---|---|
| L5 | | | 1.22 | 1.7762 | 49.4 |
| | S10 | −49.535 | | | |
| | | | Z2 | | |

ASPHERICAL SURFACE DATA:

| S | D | E | F | G | H | I |
|---|---|---|---|---|---|---|
| S4 | .14820E-3 | −.40780E-6 | −.30109E-8 | .38939E-10 | −.87499E-12 | .35204E-14 |
| S6 | −.15875E-5 | .60612E-6 | −.97661E-9 | .49962E-10 | −.56869E-12 | .57686E-14 |
| S7 | .60796E-4 | .18751E-6 | .44960E-8 | −.77549E-11 | −.27249E-12 | .26896E-14 |

ZOOM SPACING DATA:

| EFL(mm) | Z1(mm) | Z2 | |
|---|---|---|---|
| 28.90 | 12.40 | 4.4 | F/No. = 2.9–5.7 |
| 49.99 | 5.71 | 23.1 | |
| 77.69 | 2.45 | 47.9 | |

TABLE IV

| LENS | | SURFACE RADIUS(mm) | AXIAL DISTANCE BETWEEN SURFACES(mm) | Ne | Ve |
|---|---|---|---|---|---|
| L1 | S1 | −16.202 | | | |
| | | | 5.18 | 1.7762 | 49.4 |
| | S2 | −48.885 | | | |
| | | | .10 | | |
| L2 | S3 | 15.667 | | | |
| | | | 4.40 | 1.5343 | 48.6 |
| | S4 | −42.958 | | | |
| | | | .16 | | |
| L3 | S5 | 108.68 | | | |
| | | | 1.00 | 1.8127 | 25.3 |
| | S6 | 23.623 | | | |
| L4 | | | 4.96 | 1.4891 | 70.2 |
| | S7 | −16.060 | | | |
| | | | Z1 | | |
| | S8 | −425.20 | | | |
| L5 | | | 4.04 | 1.4891 | 70.2 |
| | S9 | −35.430 | | | |
| | | | 1.35 | | |
| | S10 | −14.147 | | | |
| L6 | | | 1.00 | 1.7162 | 53.7 |
| | S11 | −251.46 | | | |
| L7 | | | 2.80 | 1.7617 | 27.3 |
| | S12 | −22.503 | | | |
| | | | 3.00 | | |
| | S13 | −10.583 | | | |
| L8 | | | 1.22 | 1.7762 | 49.4 |
| | S14 | −44.445 | | | |
| | | | Z2 | | |

ASPHERICAL SURFACE DATA:

| S | D | E | F | G | H | I |
|---|---|---|---|---|---|---|
| S4 | .10386E-3 | .14209E-6 | −.88495E-8 | .12477E-9 | −.10367E-11 | .36556E-14 |
| S7 | .42721E-4 | .12484E-6 | .97079E-8 | −.18444E-9 | .18644E-11 | −.77975E-14 |
| S8 | .11339E-3 | .48165E-6 | .18776E-7 | −.57571E-9 | .89994E-11 | −.46768E-13 |

ZOOM SPACING DATA:

| EFL(mm) | Z1(mm) | Z2(mm) | |
|---|---|---|---|
| 29.0 | 9.48 | 4.40 | f/No. = 2.9–5.7 |
| 49.97 | 4.48 | 21.21 | |
| 77.8 | 2.00 | 43.81 | |

TABLE V

| LENS | | SURFACE RADIUS(mm) | AXIAL DISTANCE BETWEEN SURFACES(mm) | Ne | Ve |
|---|---|---|---|---|---|
| L1 | S1 | −34.873 | | | |
| | | | 1.22 | 1.7762 | 49.4 |
| | S2 | 39.167 | | | |
| L2 | | | 3.19 | 1.7231 | 29.3 |
| | S3 | −160.09 | | | |
| | | | Z1 | | |
| | S4 | 18.891 | | | |
| L3 | | | 3.56 | 1.6256 | 57.9 |
| | S5 | −256.28 | | | |
| | | | .098 | | |
| | S6 | 96.130 | | | |
| L4 | | | 1.32 | 1.8550 | 23.6 |
| | S7 | 24.799 | | | |

TABLE V-continued

| | | | | | | |
|---|---|---|---|---|---|---|
| L5 | | | | 10.532 | 1.4891 | 70.2 |
| | S8 | −22.205 | | | | |
| | | | | Z2 | | |
| | S9 | −79.728 | | | | |
| L6 | | | | 2.83 | 1.7444 | 52.4 |
| | S10 | 34.345 | | | | |
| L7 | | | | 3.57 | 1.6942 | 30.9 |
| | S11 | −44.971 | | | | |
| | | | | 3.30 | | |
| | S12 | −13.929 | | | | |
| L8 | | | | 1.04 | 1.7762 | 49.4 |
| | S13 | −190.16 | | | | |
| | | | | Z3 | | |

ASPHERICAL SURFACE DATA:

| S | D | E | F | G | H | I |
|---|---|---|---|---|---|---|
| S5 | .41714E-4 | −.36063E-7 | −.46394E-8 | .22854E-9 | −.33844E-11 | .16804E-13 |

ZOOM SPACING DATA:

| EFL(mm) | Z1(mm) | Z2(mm) | Z3(mm) | |
|---|---|---|---|---|
| 29.6 | 14.58 | 12.4 | 6.0 | f/No. = 4.2–5.7 |
| 50.0 | 11.23 | 7.25 | 22.6 | |
| 83.9 | 0.93 | 7.32 | 38.0 | |

TABLE VI

| LENS | | SURFACE RADIUS(mm) | AXIAL DISTANCE BETWEEN SURFACES(mm) | Ne | Ve |
|---|---|---|---|---|---|
| | S1 | −28.134 | | | |
| L1 | | | 1.2 | 1.7762 | 49.4 |
| | S2 | 79.196 | | | |
| L2 | | | 2.53 | 1.7343 | 28.1 |
| | S3 | −100.279 | | | |
| | | | Z1 | | |
| | S4 | 19.591 | | | |
| L3 | | | 3.98 | 1.5914 | 61.0 |
| | S5 | 6681.9 | | | |
| | | | .10 | | |
| | S6 | 59.267 | | | |
| L4 | | | 1.30 | 1.8127 | 25.3 |
| | S7 | 22.155 | | | |
| L5 | | | 6.48 | 1.4891 | 70.2 |
| | S8 | −23.391 | | | |
| | | | Z2 | | |
| | S9 | 81.648 | | | |
| L6 | | | 5.81 | 1.5187 | 64.0 |
| | S10 | −37.000 | | | |
| | | | .82 | | |
| | S11 | −19.642 | | | |
| L7 | | | 1.00 | 1.8396 | 42.8 |
| | S12 | 84.909 | | | |
| L8 | | | 3.37 | 1.7471 | 27.6 |
| | S13 | −20.148 | | | |
| | | | 2.55 | | |
| | S14 | −10.873 | | | |
| L9 | | | 1.02 | 1.7762 | 49.4 |
| | S15 | −102.707 | | | |
| | | | Z3 | | |

ASPHERICAL SURFACE DATA:

| S | D | E | F | G | H | I |
|---|---|---|---|---|---|---|
| S5 | .48178E-4 | .50097E-7 | .13449E-9 | .29182E-11 | −.35994E-13 | .12406E-15 |
| S9 | .67164E-4 | .17562E-6 | .49909E-8 | −.36481E-10 | .17331E-12 | .22697E-14 |

ZOOM SPACING DATA:

| EFL(mm) | Z1(mm) | Z2(mm) | Z3(mm) | |
|---|---|---|---|---|
| 29.6 | 13.32 | 11.73 | 6.0 | f/No. = 4.2–8.6 |
| 50.0 | 9.76 | 6.57 | 21.4 | |
| 85.0 | 5.09 | 4.26 | 43.6 | |
| 160.3 | .50 | 3.12 | 87.5 | |

TABLE VII

| LENS | | SURFACE RADIUS(mm) | AXIAL DISTANCE BETWEEN SURFACES(mm) | Ne | Ve |
|---|---|---|---|---|---|
| | | APERTURE STOP | 1.5 | | |
| | S1 | −6.158 | | | |

TABLE VII-continued

| LENS | | SURFACE RADIUS(mm) | AXIAL DISTANCE BETWEEN SURFACES(mm) | Ne | Ve |
|---|---|---|---|---|---|
| L1 | | | .76 | 1.7479 | 44.6 |
| | S2 | 11.182 | | | |
| L2 | | | 3.20 | 1.6430 | 59.9 |
| | S3 | −9.424 | | | |
| | | | .01 | | |
| | S4 | −124.660 | | | |
| L3 | | | 1.60 | 1.7162 | 53.7 |
| | S5 | −14.943 | | | |
| | | | .01 | | |
| | S6 | 22.372 | | | |
| L4 | | | 2.20 | 1.5498 | 62.6 |
| | S7 | −21.169 | | | |
| | | | Z1 | | |
| | S8 | −31.047 | | | |
| L5 | | | 1.80 | 1.4891 | 70.2 |
| | S9 | −13.987 | | | |
| | | | .13 | | |
| | S10 | −40.796 | | | |
| L6 | | | .57 | 1.8083 | 46.3 |
| | S11 | 65.847 | | | |
| | | | 5.75 | | |
| | S12 | −9.600 | | | |
| L7 | | | .40 | 1.8108 | 40.1 |
| | S13 | −23.928 | | | |
| | | | Z2 | | |
| | S14 | 25.924 | | | |
| L8 | | | 2.28 | 1.5187 | 64.0 |
| | S15 | PLANO | | | |

ZOOM SPACING DATA:

| EFL(mm) | Z1(mm) | Z2(mm) | |
|---|---|---|---|
| 15.40 | 6.38 | .39 | f/No. = 3.0–5.7 |
| 21.88 | 3.09 | 8.78 | |
| 34.99 | .16 | 25.83 | |

TABLE VIII

| LENS | | SURFACE RADIUS(mm) | AXIAL DISTANCE BETWEEN SURFACES(mm) | Ne | Ve |
|---|---|---|---|---|---|
| | S1 | 12163.8 | | | |
| L1 | | | 3.5 | 1.593 | 35.3 |
| | S2 | −31.182 | | | |
| L2 | | | 1.18 | 1.7762 | 49.4 |
| | S3 | 67.051 | | | |
| | | | Z1 | | |
| | S4 | 20.026 | | | |
| L3 | | | 3.50 | 1.6425 | 59.9 |
| | S5 | 80.382 | | | |
| | | | .40 | | |
| | S6 | 66.167 | | | |
| L4 | | | 1.27 | 1.8550 | 23.6 |
| | S7 | 30.308 | | | |
| L5 | | | 11.96 | 1.4891 | 70.2 |
| | S8 | −19.051 | | | |
| | | | Z2 | | |
| | S9 | −123.134 | | | |
| L6 | | | 2.73 | 1.7444 | 52.4 |
| | S10 | −189.053 | | | |
| L7 | | | 4.99 | 1.8550 | 23.6 |
| | S11 | −45.867 | | | |
| | | | 3.21 | | |
| | S12 | −10.906 | | | |
| L8 | | | 1.00 | 1.7762 | 49.4 |
| | S13 | −46.310 | | | |
| | | | Z3 | | |

ASPHERICAL SURFACE DATA:

| S | D | E | F | G | H | I |
|---|---|---|---|---|---|---|
| S5 | .43696E-4 | .47824E-7 | .18140E-8 | −.47808E-11 | −.76286E-13 | .68711E-15 |
| S9 | .47512E-4 | −.83431E-7 | .11979E-7 | −.18275E-9 | .15030E-11 | −.33165E-14 |

ZOOM SPACING DATA:

| EFL(mm) | Z1(mm) | Z2(mm) | Z3(mm) | |
|---|---|---|---|---|
| 35.0 | 10.65 | 12.15 | 8.2 | f/No. = 4.2–6.9 |
| 50.0 | 4.89 | 9.62 | 17.2 | |
| 85.0 | .45 | 5.88 | 40.0 | |
| 127.6 | .18 | 2.92 | 108.7 | |

TABLE IX

| LENS | | SURFACE RADIUS (mm) | AXIAL DISTANCE BETWEEN SURFACES (mm) | Ne | Ve |
|---|---|---|---|---|---|
| L1 | S1 | −44.3183 | | | |
| | | | 1.3000 | 1.77618 | 49.49 |
| | S2 | 28.1969 | | | |
| | | | 1.0015 | | |
| | S3 | 27.2020 | | | |
| L2 | | | 3.2000 | 1.81264 | 25.27 |
| | S4 | 80.9608 | | | |
| | | | Z1 | | |
| | S5 | 41.5626 | | | |
| L3 | | | 3.3000 | 1.51976 | 51.97 |
| | S6 | −38.2214 | | | |
| | | | .2000 | | |
| | S7 | 17.4343 | | | |
| L4 | | | 4.1000 | 1.48912 | 70.57 |
| | S8 | −31.0274 | | | |
| L5 | | | 3.4604 | 1.81264 | 25.27 |
| | S9 | 296.1301 | | | |
| | | | Z2 | | |
| | S10 | −10.6703 | | | |
| L6 | | | 1.2000 | 1.77620 | 49.41 |
| | S11 | −25.1830 | | | |
| | | | .2000 | | |
| | S12 | −243.6491 | | | |
| L7 | | | 4.4000 | 1.81264 | 25.27 |
| | S13 | −41.1776 | | | |
| | | | 51.7674 | | |

ZOOM SPACING DATA:

| EFL(mm) | Z1(mm) | Z2(mm) | Z3(mm) | |
|---|---|---|---|---|
| 38.8 | 13.551 | 24.124 | 10.710 | f/No. = |
| 49.9 | 9.340 | 22.440 | 19.444 | 3.8–8.4 |
| 100.9 | .500 | 20.940 | 51/878 | |

TABLE X

| LENS | | SURFACE RADIUS (mm) | AXIAL DISTANCE BETWEEN SURFACES (mm) | Ne | Ve |
|---|---|---|---|---|---|
| L1 | S1 | −28.9185 | | | |
| | | | 1.3000 | 1.77620 | 49.41 |
| | S2 | 36.7139 | | | |
| | | | .1000 | | |
| | S3 | 23.0420 | | | |
| L2 | | | 2.3000 | 1.81264 | 25.27 |
| | S4 | 44.9431 | | | |
| | | | Z1 | | |
| | S5 | 34.0079 | | | |
| L3 | | | 3.2500 | 1.72792 | 37.74 |
| | S6 | −32.3636 | | | |
| | | | .2000 | | |
| | S7 | 17.6823 | | | |
| L4 | | | 4.4000 | 1.51201 | 63.23 |
| | S8 | −13.5445 | | | |
| L5 | | | 1.0000 | 1.81264 | 25.27 |
| | S9 | 413.7703 | | | |
| | | | 2.3721 | | |
| | S10 | −40.7759 | | | |
| L6 | | | 7.0473 | 1.66884 | 35.62 |
| | S11 | −19.3292 | | | |
| | | | Z2 | | |
| | S12 | −10.4914 | | | |
| L7 | | | 1.2000 | 1.79014 | 43.71 |
| | S13 | −903.7652 | | | |
| | | | .2000 | | |
| | S14 | 188.3742 | | | |
| L8 | | | 4.6894 | 1.81264 | 25.27 |
| | S15 | −37.1374 | | | |
| | | | 31.5964 | | |

ZOOM SPACING DATA:

| EFL(mm) | Z1(mm) | Z2(mm) | Z3(mm) | |
|---|---|---|---|---|
| 36.2 | 4.789 | 11.563 | 9.592 | f/No. - |
| 49.8 | 2.210 | 10.159 | 18.969 | 3.5–5.9 |
| 67.6 | .500 | 8.861 | 31.596 | |

In all of the disclosed embodiments, both of the lens units G1 and G2 move in the same direction as do the sub-units where differential movement is provided as the EFL is varied. This simplifies the mechanics of the lens since no reversing movement is required.

Lens embodying the invention provide a further advantage in that the entrance pupil and hence, the aperture stop, may be positioned on the object side of the front vertex. This permits its use with other optical systems in many applications, such as optical scanners, add-on zoom modules, and others where exit pupil of one optical system can be easily matched with the entrance pupil of the zoom lens described herein.

In the embodiment of Table VII, the entrance pupil and hence, the aperture stop, are positioned 1.5 mm in front of the front vertex. Any lens embodying the invention may be designed with such forward positioning of the entrance pupil.

Table XI shows the location of the second principal point PP2 of the first lens unit G1 with respect to the image side vertex thereof at the shortest EFL.

TABLE XI

| TABLE | PP2(mm) |
|---|---|
| I | 4.24 |
| II | 3.40 |
| III | .40 |
| IV | −.15 |
| V | .52 |
| VI | 2.34 |
| VII | 3.48 |
| VIII | .46 |
| IX | 5.83 |
| X | −2.74 |

In the embodiment of Table IV, the second principal point PP2 of the example of FIG. 4 and Table IV is less than 1% of the shortest EFL within the image side vertex of the first lens unit. In the embodiment of FIG. 10 and Table X, the second principal point PP2 is less than 8% of the shortest EFL of the lens. This positioning of PP2 in Example X is due to the incorporation of the thick positive meniscus L6 in sub-unit SG2 of lens unit G1. Here the second principal point PP2 is also closely adjacent the rear vortex of the first lens unit.

As discussed before, while not limiting the bounds of the invention, this location of the second principal point aids in providing the compactness of lenses embodying the invention and the short travel for zoomings.

An important feature of the invention is that the second lens unit G2 has a larger magnification ratio than the second lens sub-unit SG2 of the first lens unit. This may be exemplified by the following:

$$u_2 > u_{12}$$

where $u_2$ is the ratio of magnification of lens unit G2 and $u_{12}$ is the ratio of magnification of lens sub-unit SG2.

The magnification ratio u of a lens unit or lens sub-unit is the ratio of the magnification ($m_t$) of a lens unit when the lens is at its longest focal length position to the magnification ($m_w$) of the lens unit at the widest angle of the lens, or $$u = \frac{m_t}{m_w}$$

This relationship permits better correction of aberrations with the smallest number of lens elements considering design parameters such as zoom range, relative aperture, spacial constraint, etc. The magnification ratios of the second lens sub-units and second lens units are set forth in Table XIII.

TABLE XIII

| TABLE | $u_{12}$ | $u_2$ |
|---|---|---|
| I | 1 | 1.92 |
| II | 1 | 1.92 |
| III | 1 | 2.69 |
| IV | 1 | 2.69 |
| V | 1.36 | 2.10 |
| VI | 1.38 | 3.92 |
| VII | 1 | 2.27 |
| VIII | 1.27 | 2.89 |
| IX | 1.60 | 1.62 |
| X | 1.19 | 1.56 |

It will be noted from Table XIII that in all cases $$u_2 > u_{12}$$

While lenses embodying the invention have been described as comprising a first lens unit having first and second sub-units and a second lens unit, a lens embodying the invention may also be considered a three lens unit lens where the first and second sub-units of the first lens unit are considered as separate lens units.

It may thus be seen that the objects of the invention set forth, as well as those made apparent from the foregoing description, are efficiently attained. While preferred embodiments of the invention have been set forth for purposes of disclosure, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A zoom lens comprising from the object end a first lens unit of overall positive power, and a second lens unit of negative power, both of said lens units being axially movable to vary the equivalent focal length of the lens, said first lens unit comprising from the object end first and second sub-units, said first sub-unit being of negative power and said second sub-unit being of positive power, said second lens unit having a greater magnification ratio than said second sub-unit and upon movement providing the majority of change of overall lens power.

2. The lens of claim 1 where said second positive sub-unit of said first lens unit comprises a biconvex element.

3. The lens of claim 1 where said first lens unit first sub-unit is of overall meniscus form.

4. The lens of claim 3 where said first lens sub-unit is concave toward the object end.

5. The lens of claim 1 where said first lens sub-unit of said first lens unit is concave toward the object end.

6. The lens of claim 1 where said second lens unit consists of a single element concave toward the object end.

7. The lens of claim 1 where said first sub-unit of said first lens unit is a single element.

8. The lens of claim 1 where said second sub-unit of said first lens unit is a single element.

9. The lens of claim 1 where said sub-units of said first lens group move differentially during zooming.

10. The lens of claim 1 where said lens further includes a stationary field flattening element adjacent the image plane of the lens.

11. The lens of claim 1 where said second lens unit comprises two sub-units which move differentially during zooming.

12. The lens of claim 1 where the entrance pupil of said lens is located on the object side of said lens.

13. The lens of claim 1 where said second lens unit comprises a negative element strongly concave to the object.

14. The lens of claim 1 where the second principal point of said first lens unit is closely adjacent or outside of the rear vertex of said first lens unit.

15. The zoom lens of claim 1 where said first sub-unit is configured to provide a monotonic increase of the marginal ray height from the optical axis determined by an axial ray emanating from a distant object and traversing said first sub-unit.

16. The lens of claim 1 wherein said first lens unit first sub-unit comprises a meniscus concave to the object.

17. The lens of claim 1 where said second sub-unit is overall biconvex.

18. The lens of claim 1 where said first lens sub-unit of said first lens unit is overall biconcave.

19. The lens of claim 18 where said first lens sub-unit of said first lens unit comprises a biconcave element and a positive meniscus.

20. The lens of claim 1 where said second sub-unit of said first lens unit comprises a doublet of overall biconvex shape.

21. The lens of claim 20 where said second sub-unit of said first lens unit further includes a thick positive meniscus.

22. The lens of claim 1 where said second sub-unit of said first lens unit comprises a biconvex element and a meniscus.

23. The lens of claim 1 where said second sub-unit comprises a negative element concave toward the object end and a positive meniscus.

24. The lens of claim 1 where said first lens sub-unit of said first lens unit includes a doublet concave to the object end.

25. The lens of claim 24 where said first sub-unit of said first lens unit includes a component of overall meniscus form.

26. The lens of claim 24 where said first sub-unit of said first lens unit includes a doublet of overall biconcave form.

27. The zoom lens of claim 1 where said first lens unit comprises a negative meniscus element concave to the object side and a biconvex element.

28. The lens of claim 1 where said first sub-unit of said first lens unit comprises a negative meniscus concave to the object and said second sub-unit consists of an overall biconvex air spaced doublet.

29. The lens of claim 1 wherein said first sub-unit of said first lens unit comprises a doublet of overall meniscus form concave to the object and said second sub-unit is overall biconvex and comprises a positive element followed by a doublet.

30. The lens of claim 1 where said first sub-unit is a doublet.

31. The lens of claim 30 where said first sub-unit is overall biconcave.

32. The lens of claim 30 where said first sub-unit is a doublet comprising a biconcave element and a positive meniscus.

33. A zoom lens comprising from the object end a first lens unit of overall positive power, and a second lens unit of negative power, both of said lens units being axially movable to vary the equivalent focal length of the lens, said second lens unit upon movement providing the majority of change of overall lens power, said first lens unit comprising from the object end first and second sub-units, said first sub-unit being of negative power and said second sub-unit being of positive power, the second principal point of said first lens unit being essentially at or outside of the image side surface of said first lens unit, said first lens sub-unit being configured to provide an increase of the marginal ray height from the optical axis determined by an axial ray emanating from a distant object and traversing said first sub-unit.

34. The lens of claim 33 where the entrance pupil of said lens is positioned on the object side of the front vertex of said lens.

35. A zoom lens comprising from the object end a first lens unit of overall positive power, and a second lens unit of negative power, both of said lens units being axially movable to vary the equivalent focal length of the lens, said first lens unit comprising from the object end first and second sub-units, said first sub-unit being of negative power and said second sub-unit being of positive power, said second lens unit having a greater magnification ratio than said second sub-unit and upon movement providing the majority of change of overall lens power, said first sub-unit being concave toward the object, said second sub-unit including at least one biconvex element.

36. The lens of claim 35 where said sub-units of said first lens group move differentially during zooming.

37. The lens of claim 35 where said second lens unit comprises two sub-units which move differentially during zooming.

38. The lens of claim 35 where the entrance pupil of said lens is located on the object side of said lens.

39. The zoom lens of claim 35 where said first sub-unit is configured to provide an increase of the marginal ray height from the optical axis determined by an axial ray emanating from a distant object and traversing said first sub-unit.

40. A zoom lens comprising from the object end a first lens unit of overall positive power, and a second lens unit of negative power, both of said lens units being axially movable to vary the equivalent focal length of the lens, said second lens unit upon movement providing the majority of change of overall lens power, said first lens unit comprising from the object end first and second sub-units, said first sub-unit being of negative power and said second sub-unit being of positive power, said second lens unit comprising a negative element concave to the object.

* * * * *